(12) United States Patent
Cox et al.

(10) Patent No.: US 8,683,558 B2
(45) Date of Patent: Mar. 25, 2014

(54) SYSTEM FOR ONLINE COMPROMISE TOOL

(75) Inventors: Jason A. Cox, Raleigh, NC (US); Lydia M. Do, Research Triangle Park, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 13/546,341

(22) Filed: Jul. 11, 2012

(65) Prior Publication Data

US 2012/0278867 A1 Nov. 1, 2012

Related U.S. Application Data

(63) Continuation of application No. 12/244,063, filed on Oct. 2, 2008, now Pat. No. 8,276,193.

(51) Int. Cl.
*H04L 29/06* (2006.01)

(52) U.S. Cl.
USPC .......... 726/4; 726/7; 709/225; 709/226; 715/276; 715/741; 715/743; 463/25

(58) Field of Classification Search
None
See application file for complete search history.

(56) References Cited

U.S. PATENT DOCUMENTS

| | | | |
|---|---|---|---|
| 6,957,390 B2* | 10/2005 | Tamir et al. | 715/744 |
| 2001/0027427 A1* | 10/2001 | Minami | 705/26 |
| 2004/0167989 A1* | 8/2004 | Kline et al. | 709/245 |
| 2007/0250622 A1* | 10/2007 | Granito | 709/224 |
| 2007/0297590 A1* | 12/2007 | Macbeth et al. | 379/201.02 |
| 2007/0299712 A1* | 12/2007 | Macbeth et al. | 705/9 |
| 2007/0299796 A1* | 12/2007 | Macbeth et al. | 706/16 |
| 2007/0300185 A1* | 12/2007 | Macbeth et al. | 715/825 |
| 2008/0005243 A1* | 1/2008 | Cohen et al. | 709/204 |
| 2008/0293375 A1* | 11/2008 | Swanburg | 455/405 |
| 2009/0222894 A1* | 9/2009 | Kenny et al. | 726/4 |
| 2010/0169491 A1* | 7/2010 | Martin | 709/226 |

* cited by examiner

*Primary Examiner* — Michael R Vaughan
(74) *Attorney, Agent, or Firm* — Yudell Isidore Ng Russell PLLC

(57) ABSTRACT

An Activity Access Control (AAC) utility controls access to applications and devices by allowing an administrator to set terms of use/access regarding a applications and/or devices for a group of users, whose activity are monitored. The AAC utility also enables administrator and user access to a compromise facility via a centralized access point to establish or request changes to the terms of use/access. The AAC utility allows the administrator to dynamically update information and set terms based on real-time information collected during activity monitoring. Dynamic updates may also occur based on the monitored user's request, the priority of the requesting user(s), historical data, occurrence of a special event, completion of other internal or/external tasks, and/or pre-set limitations or thresholds. In addition, the AAC utility facilitates the real-time display or publishing of the terms of use, status information, and statistical information to users and the administrator.

17 Claims, 6 Drawing Sheets

SYSTEM FOR ONLINE COMPROMISE TOOL

PRIORITY CLAIM

The present application is a continuation of and claims priority from U.S. patent application Ser. No. 12/244,063, filed on Oct. 2, 2008, titled "System for Online Compromise Tool," which is incorporated by reference herein in its entirety and for all purposes.

BACKGROUND

1. Technical Field

The present invention generally relates to data processing systems and in particular to device and application access control in data processing systems.

2. Description of the Related Art

There is a wealth of information currently available through informational media, such as radio, television, and the World Wide Web. Within the past few years, development in content-driven information has come a long way to provide rich media formats and fast access to information. This development has paved the way for online social networking sites like MySpace® and Facebook®, which are highly popular among an audience of young teens and adults. This same audience has also been able to enjoy the transformation of electronic devices (i.e. television, game consoles, etc.) into Internet-integrated multimedia systems. With the easy accessibility and abundance of information, today's parent faces tough challenges in protecting children from online predators, access to inappropriate content, spending mindless hours on game-play, or simply from the children "growing up too fast".

SUMMARY OF ILLUSTRATIVE EMBODIMENTS

Disclosed are a method, a system, and a computer program product for providing a facility by which access and/or usage to applications and devices are monitored and controlled based on administratively-established and/or compromised terms for such access/usage. An Activity Access Control (AAC) utility allows an administrator to define policies and set terms for use/access regarding a set of applications and devices for a group of users, whose activity are monitored. The AAC utility also enables administrator access as well as user access to a compromise facility via a centralized access point to establish or request changes to the terms that guide usage/access. The AAC utility allows the administrator to dynamically update information and set terms based on real-time information collected during activity monitoring. Dynamic updates may also occur based on the monitored user's request, the priority of the requesting user(s), historical data, the occurrence of a special event, completion of other internal or external tasks, and/or pre-set limitations or thresholds. In addition, the AAC utility facilitates the display or publishing of the terms of use, status information, and statistical information (retrieved/generated from the collected data) to users and the administrator. The display or publishing may occur in real time during usage of the application or device.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
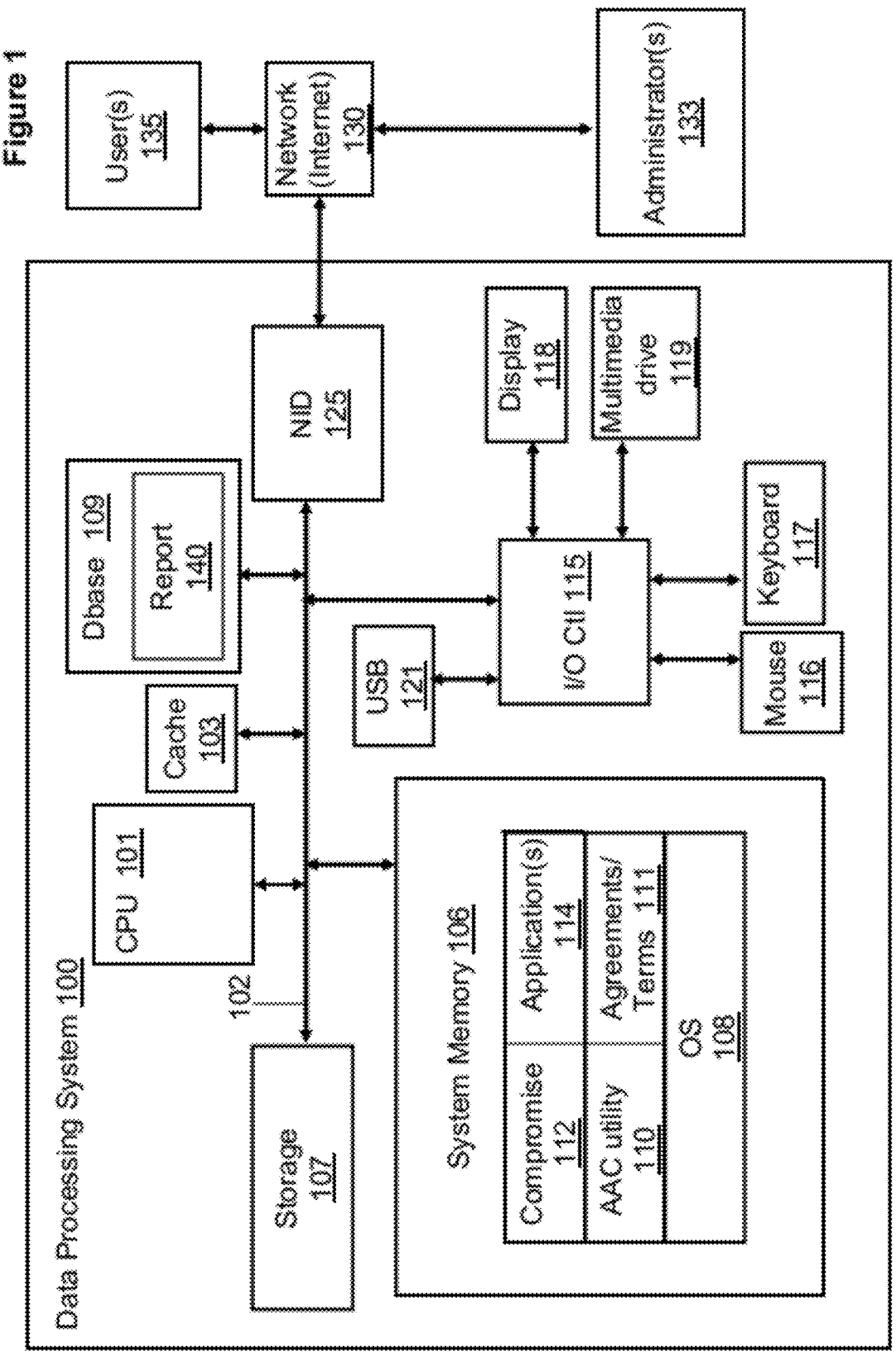
FIG. 1 is a block diagram representation of a data processing system, according to one embodiment.

The illustrative embodiments provide a method, a system, and a computer program product for providing a facility by which access and/or usage to applications and devices are monitored and controlled based on administratively-established and/or compromised terms for such access/usage. An Activity Access Control (AAC) utility allows an administrator to define policies and set terms for use/access regarding a set of applications and devices for a group of users, whose activity are monitored. The AAC utility also enables administrator access as well as user access to a compromise facility via a centralized access point to establish or request changes to the terms that guide usage/access. The AAC utility allows the administrator to dynamically update information and set terms based on real-time information collected during activity monitoring. Dynamic updates may also occur based on the monitored user's request, the priority of the requesting user (s), historical data, the occurrence of a special event, completion of other internal or external tasks, and/or pre-set limitations or thresholds. In addition, the AAC utility facilitates the display or publishing of the terms of use, status information, and statistical information (retrieved/generated from the collected data) to users and the administrator. The display or publishing may occur in real time during usage of the application or device.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIGS. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. Specifically, as utilized herein, the following terms are defined as follows: "administrator" and "administrative user" both refer to a client with special permissions and/or high priorities and who defines policy for the AAAC utility to enforce, and who also sets priorities for less privileged users and/or general users. As described hereinafter, the administrator accesses the AAAC utility (executing on a data processing system) via an administrator device, which may be a computer or other electronic device. The term "user" (by itself) refers to a non-administrative user with relatively lower priority privileges (than an administrator). Furthermore, the user is a client whose activity is being monitored. The user also has access to the AAC utility to view the policy of usage, and may request updates/changes to terms set for the user, device, or the activity (e.g., the user may request additional time for an activity). The user accesses and/or submits requests to the AAAC utility via a user device, which may also be a computer or other electronic device. Further, as utilized herein, the term activity also encompasses utilization or access to applications, services, and the like.

With reference now to FIG. 1, there is depicted a block diagram representation of a data processing system (and connected network) within which functional aspects of the invention are implemented. DPS 100 comprises at least one processor or central processing unit (CPU) 101 connected to system memory 106 via system interconnect/bus 102. Also connected to system bus 102 is I/O controller 115, which provides connectivity and control for input devices, of which pointing device (or mouse) 116 and keyboard 117 are illustrated, and output devices, of which display 118 is illustrated. Additionally, a multimedia drive 119 (e.g., CDRW or DVD drive) and USB (universal serial bus) hub 121 are illustrated, coupled to I/O controller. Multimedia drive 119 and USB hub 121 may operate as both input and output (storage) mechanisms. DPS 100 also comprises storage 107, within which data/instructions/code may be stored. In addition to storage, DPS 100 is further illustrated with database (DB) 109, within which is stored report data 140. Report data 140 may include historical data utilized during processing by the AAC utility. Application of report data 140 within the processes described herein will be understood within the following description and particular the description of FIG. 5.

DPS 100 is also illustrated with a network interface device (NID) 125, with which DPS 100 connects to one or more other devices, such as administrator device 133 and user device 135, via access network 130, such as the Internet. In the described embodiments, network 130 is a worldwide collection of networks and gateways that utilize the Transmission Control Protocol/Internet Protocol (TCP/IP) suite of protocols to communicate with one another. Of course, network access may also be provided via a number of different types of networks, such as an intranet, a local area network (LAN), a virtual private network (VPN), or other wide area network (WAN) other than the Internet, for example.

Notably, in addition to the above described hardware components of DPS 100, various features of the invention are completed via software (or firmware) code or logic stored within memory 106 or other storage (e.g., storage 107) and executed by CPU 101. Thus, illustrated within memory 106 are a number of software/firmware components, including operating system (OS) 108 (e.g., Microsoft Windows®, a trademark of Microsoft Corp, GNU®/Linux®, registered trademarks of the Free Software Foundation and Linus Torvalds, or AIX®, a registered trademark of IBM). Additionally, among these components are, Activity Access Control (AAC) utility 110, Terms of Use/Agreements 111 and Compromise facility 112, which collectively enable the functional features of the invention. In actual implementation, application 114 is also provided and features provided by AAC utility 110 may be combined with those of application 114 to present a single application, which collectively provides the executing application with a real-time dynamic display of the terms and other parameters enabled by AAAC utility 110. While illustrated as separate components, the described embodiment presents agreements/terms 111 and compromise facility 112 as functional parts of the AAAC utility 110. For simplicity, AAC utility 110 is illustrated and described as a stand alone or separate software/firmware component, which provides specific functions, incorporating the overall functions of the various other software components, where necessary, and as described below.

CPU 101 executes AAC utility 110 as well as OS 108, which supports the user interface features of AAC utility 110. In the illustrative embodiment, AAC utility 110 generates/provides several graphical user interfaces (GUI) to enable user interaction with, or manipulation of, the functional features of the utility (110). Among the software code/instructions provided by AAC utility 110, and which are specific to the invention, are: (a) code for controlling access to applications and devices; (b) code for setting terms of use/access regarding one or more applications and/or devices for a group of users; (c) code for dynamically updating terms based on information collected during monitoring of user activities; (d) code for dynamically updating the terms as a result of compromise conditions or other factors, including, without limitation, the monitored user's request, the priority of the requesting user(s)/administrator, historical data, the occurrence of a special event, completion of other internal or external tasks, and/or pre-set limitations or thresholds; (e) code for downloading to the administrator and/or user device a plug-in (subroutine) that enables display of current terms and remote interaction with the AAAC utility; and (f) code for dynamically displaying, in real time, the current terms of use/access, status information, and statistical information (retrieved/generated from the collected data) on the device (or within the application) of the users and the administrator. For simplicity of the description, the collective body of code that enables these various features is referred to herein as AAC utility 110. According to the illustrative embodiment, when CPU 101 executes AAC utility 110, DPS 100 initiates a series of functional processes that enable the above functional features as well as additional features/functionality, which are described below within the description of FIGS. 2-6.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Figure 2:
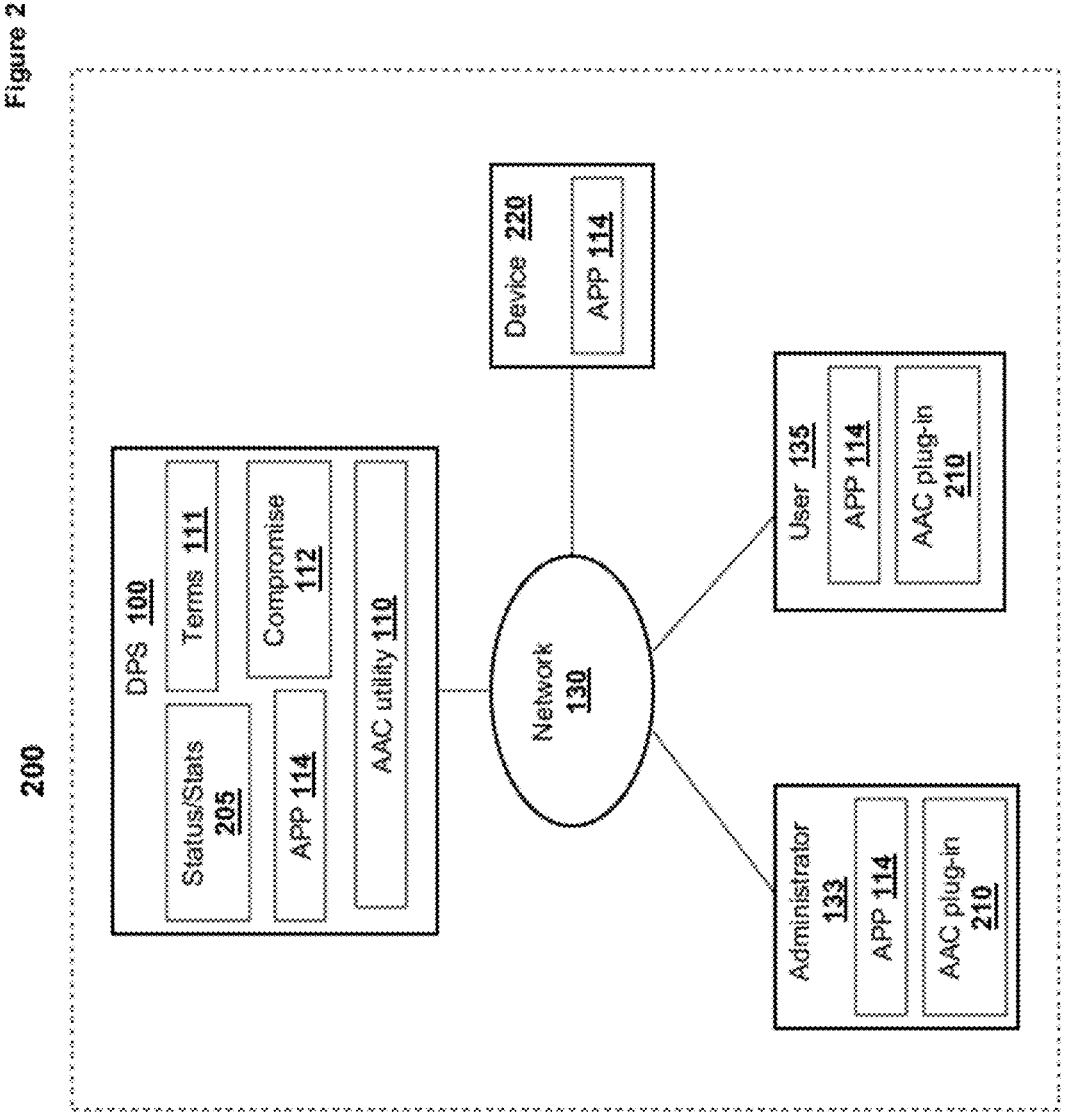
FIG. 2 illustrates a network in which administrators connect to a compromise control to control access to activities and devices, according to one embodiment.

With reference now to FIG. 2, a network is illustrated in which administrators and users connect to a compromise control facility, which controls access to activities and devices, according to one embodiment. Network 200 comprises administrator device 133 and user device 135 that both connect to DPS 100 (also illustrated in FIG. 1) via network 130. Also connected to DPS 100 via network 130 is representative device 220. Administrator device 133 and user device 135 both comprise APP 114 and AAC utility plug-in 210. In addition to the software components presented in FIG. 1, DPS 100 of FIG. 2 is further illustrated with status/statistical data (status/stats) 205.

In Network 200, AAAC utility 110 enables an administrator utilizing administrator device 133 to configure compromise facility 112 as an N-way interactive access, activity control and policy enforcement facility. That is, administrator device is utilized to configure compromise facility 112 as 2-way, 3-way, and so on, facility, with N being an integer number that represents the "n" number of parties involved in the compromise and which are provided access to the application or device. For purposes of the described embodiment, the number N is assumed to include the administrator as one of the parties. The compromise facility 112 establishes base guidelines/terms for an activity and/or usage of a device or application. Compromise facility 112 is accessible at or through a centralized access point (e.g., DPS 100 located at a specific Internet Protocol (IP) address), and compromise facility 112 manages the information associated with a monitored activity (e.g., executing APP 114) or device (e.g., device 220). Compromise facility 112 is a dynamic facility that allows an administrator to enter negotiations with one or more users to update the terms based on an event or task-based methodology.

Administrator device 133 and user device 135 may represent electronic devices with access to the Internet and/or designed with the capability to call/dial/text into compromise facility 112. Examples of electronic methods of communication to compromise facility 112 enabled by AAC utility 110 include via Internet transmission; Voice-to-text communication; Email; Text Messaging; End-user console communication; and Instant Messaging.

In the illustration of FIG. 2, compromise facility 112 (executing on DPS) may represent a server application (where DPS 100 is a server) that provides a particular service or application, which is utilized by or on one or more user devices 135. Also, administrator device 133 and user device 135 may be computer devices, similar to DPS 100, or different types of devices that have the capability to connect to and communicate with DPS 100 via some form of network or direct connection. Additionally, in one embodiment, a single device may be utilized to provide the functionality of both administrator device 133 and user device 135, where the level of access to the compromise facility 112 is controlled by a login credential and security mechanism (password) that differentiates the administrator from the user(s). For simplicity, the functions performed by an administrator utilizing an administrator device 133 and those functions which are performed by the administrator device itself are interchangeably described as functions of the administrator. Likewise, the functions performed by a user utilizing a user device 135 and those functions which are performed by the user device itself are interchangeably described as functions of the user. Where appropriate, the utilization of administrator and/or user are understood and should be construed to refer to the specific device (133/135) that is being utilized to perform the specific function/interaction with the AAC utility.

During an initial configuration of the terms of usage for a device or application, the administrator accesses the DPS 100 and specifically the compromise facility 112 executing on the DPS 100 and sets up the list of users to which the terms are applicable. The AAC utility 110 then generates a terms record (111) for that application or device, with permissions and monitoring parameters for the administrator and users. Depending on the device or application being configured, the AAC utility 110 may then download appropriate plug-ins 210 to the administrator and the user devices. The plug-ins 210 enable administrator and user interaction with the compromise facility 112, receipt by the AAC utility 110 of real time requests from the users and/or administrator for changes/modifications to the set terms, display of current status/statistics, where appropriate at the administrator and/or user device, and other functionality as appropriate for the particular implementation.

AAC utility 110 allows administrator 133 to set Terms (of Agreement) 111. For example, when parents wish to have greater control of their children's activities, the parent, acting as administrator and/or utilizing an administrative access (via administrator device 133, for example), may set specific terms 111 for children's access to an application or device. In network 200, an example methodology that may be applied in setting terms include use of a unified time bank operation (which may be included within APP 114) tied to the monitored activity or device. Administrator 133 may initiate updates of the time bank according to a task-based process. For example, parent (administrator 133) may assign a list of chores, the completion of which are monitored by AAC utility 110, which is configured by the parent (administrator 133) to monitor such completion for specific children (users 135). The users 135 marks off each chore as that chore is completed, and each chore marked off results in AAC utility 110 adding a variable "X" amount of time/credit/points to the time bank for the particular child (user 135). The child (User 135) checks off chores within the displayed terms/stats window on the user device, as the chore is completed, which results in AAC utility adding X to the time bank. As utilized, X may be variable based on the specific chores completed, where one chore may be worth more time/credit/points than another, as established by the administrator 133. The AAC utility 110, through the plug-ins 210, may display the current accrued value of time/credit/points as well as which chores have been completed and which chores still remain to be completed, along with their relative point values.

In one embodiment, with compromise facility 112, the user 135 may request changes to the relative amount of time/credit/points awarded for completion of certain chores, and the administrator 133 may respond with a compromise, which is then displayed to the users 135. In an alternate embodiment, compromise facility 112 may provide a dynamic adjustment of the time/credit/points based on factors, such as the monitored user's request, the priority of the requesting user(s)/administrator, historical data, the occurrence of a special event, completion of other internal or external tasks, and/or pre-set limitations or thresholds. In the above example, Administrator 133 may also initiate updates of the time bank according an event-based process (which may be included within APP 114). For example, the terms 111 may include an indication of a set amount/number of time/credit/points to assign for occurrence of specific events, such as a birthday. Thus, in the above example, assuming that Johnny (user 135) celebrates a $12^{th}$ birthday on a pre-programmed date, the AAC utility automatically assigns to Johnny (user 135) the pre-set number of hours (e.g., 12 hours), which time is automatically added to the Johnny's time bank.

AAC utility 110 may use a Usage Increment/Decrement facility (which may be included within APP 114) to control the manner in which time is extracted from the time bank for each monitored activity or device. The time may accordingly be scaled depending on the monitored activity or device being used. This time scaling may also be applicable to cases in which certain computer programs or TV shows (perhaps based on a rating) count for different proportions of time. AAC utility 110 applies time extraction in the following example: Little Jenny is allowed 1 hour of usage per day. Parent(s) 133 prefer to let Jenny talk on the phone than allow her to play video games. As a result, for Jenny, parent(s) 133 set up phone minutes that only count as ¼ of a minute, while video game minutes count as a full minute or some larger time usage (greater than 1 minute) to discourage excessive usage by Jenny of video games. Utilizing the compromise facility, Jenny may request the video game minutes be increased when Jenny receives all A's on her midterm report. The AAC utility 110 then makes this adjustment if the administrator has this specific condition pre-set within the terms 111.

As another example of the usage of Compromise facility 112, a wireless family share plan specifies phone usage at a total of 1200 minutes per month. The parent (administrator 133, which may be represented by the parent's cell phone device) in a family of three (3) decides that everyone is allocated 400 minutes. AAC utility 110 allows the parent (administrator 133) to set this allocation (via compromise facility 112) of 400 minutes as a base term for cell phone usage each month. Furthermore, the general usage of a cell phone/device, online access, and other usage parameters are established as base terms set by the parent/administrator 133. These terms are made available to anyone with access (e.g., administrator 133 and user 215) to the centralized information. Thus, for example, the terms are made available to the parent, accessing the information as/via administrator 133 and the two other family members who access the information as/via user 135. The combination of the two users 135 and the administrator 133 then represents the monitored entities or devices, whose cell phone minute usage are monitored based on the administratively-established/set terms of 400 minutes per month per device/user.

In Network 200, user 135 may help set terms 111, especially in cases where an initial activity is monitored and then terms 111 are set/updates based on the gathered information (e.g., status/statistical data 205). Another example of the application of compromise facility 112 is provided as follows: A father (administrator 133) gets a gaming console (i.e. Microsoft™ XBOX 360™) (illustrated by XBOX device 220, for example) for his daughter, Lucille. The father also has a son, Trevor, who the father (administrator 133) knows also wants to spend time on the XBOX device 220. The father (administrator 133) wishes to monitor the children's usage time on the XBOX device 220. The father initiates usage of the compromise facility 112. However, since the father (administrator 133) has just initiated usage of compromise facility 112, the father (administrator 133) is not able to set fair terms at the onset of device usage. However, utilizing the monitoring functionality of the AAC utility 110, the father (administrator 133) is able to gather usage information on the two children (user(s) 135) for a week. The father is then able to utilize the information to set the appropriate terms as a family. In one embodiment, the terms may be set following entry of requests from compromise by both Lucille and/or Trevor via device 220 or user device 135.

Another example of the application of compromise facility 112 is as follows: Lucille is at home babysitting Trevor while Father (administrator 133) takes an out-of-town client out to dinner. Lucille and Trevor (users 215) want to play a game (e.g., APP 114) on their XBOX device 220 which they (users 215) approximate takes two hours. The children (users 215) submit a request via network 200 to their father (administrator 133) for transmission to their father's cell phone. The father receives a text message indication of the request on the father's cell phone while the father is at dinner. Father (administrator 133) is aware that a game only takes one hour. Father recognizes that the children (users 215) are trying to "pull a fast one on" father (administrator 133) by getting him (administrator 133) to relax pre-established XBOX usage terms 111, while their father is distracted at dinner. Father (administrator 133) counter-offers with approval for one hour of activity. The counter-offer is entered via the cell phone and transmitted to compromise facility 112, which displays the counter offer to the user 135 The children (users 215) receive the counter-offer and accept, knowing their Father (administrator 133) is "wise to their tricks". The AAC utility 110 then monitors the actual usage of the XBOX and provides a display indication of the compromised terms and a real time statistical reminder thereof.

Figure 3:
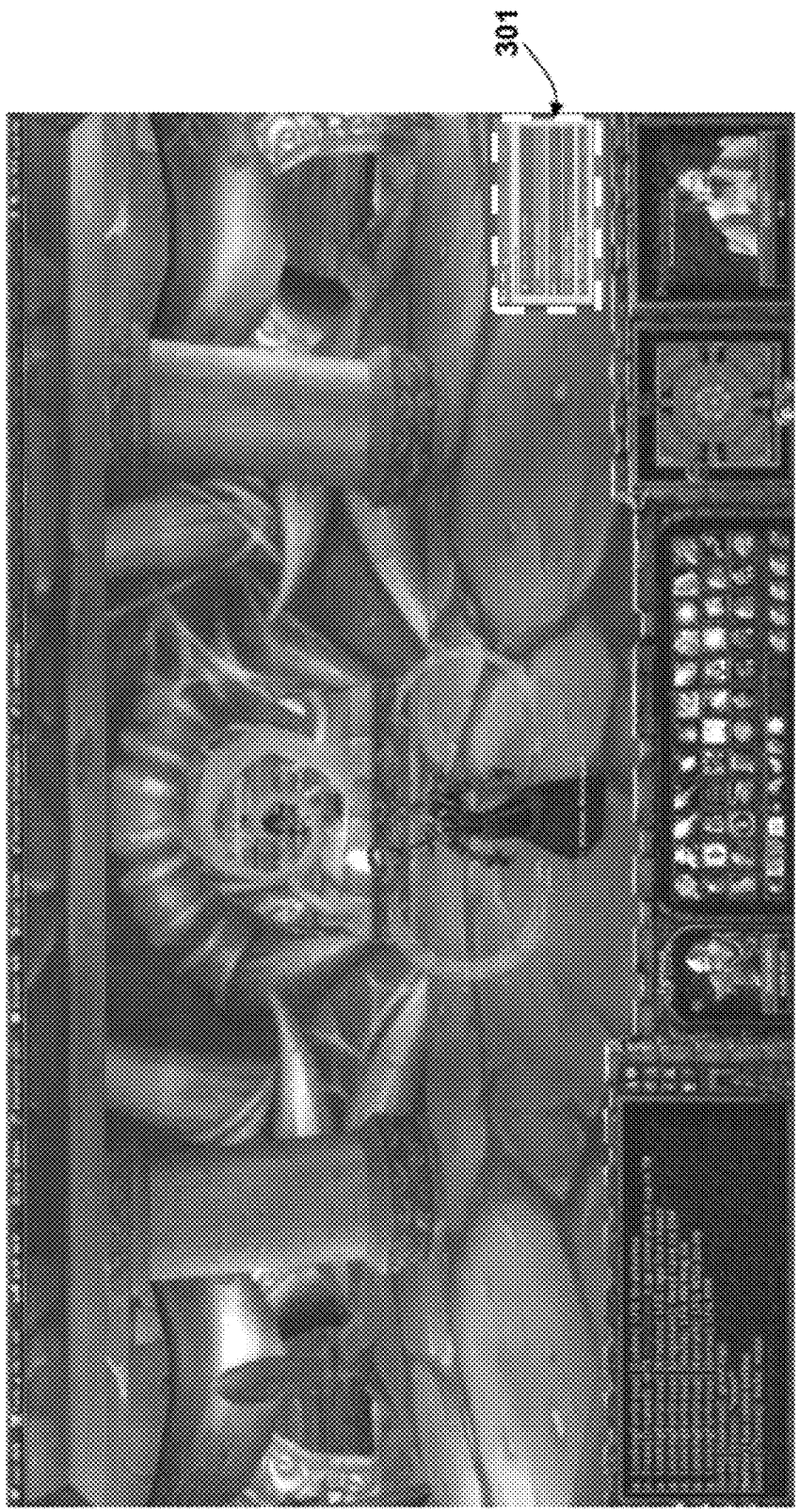
FIG. 3 is a visual capture of a display window of video game in progress with an information display segment providing status and statistical information to a user, according to one embodiment.

FIG. 3 illustrates a display window of a video game in progress with an information display segment providing status and statistical information to a user, according to one embodiment. As shown, Game Display 300 comprises (video game) Heads-Up Display (HUD) 301 (outlined in dashed lines).

HUD 301 is generated by the plug-in that is downloaded and/or embedded within the video game display, and HUD 301 provides information to the gamer (user 135) during a game in progress about the terms of use/access to the game. The presentation of status or statistical information from the monitored activity (i.e., a video game) is incorporated into game/application being monitored, as illustrated by Game Display 300. The actual information regarding compromised terms is displayed and may even be updated and displayed in real-time in HUD 301.

Figure 4:
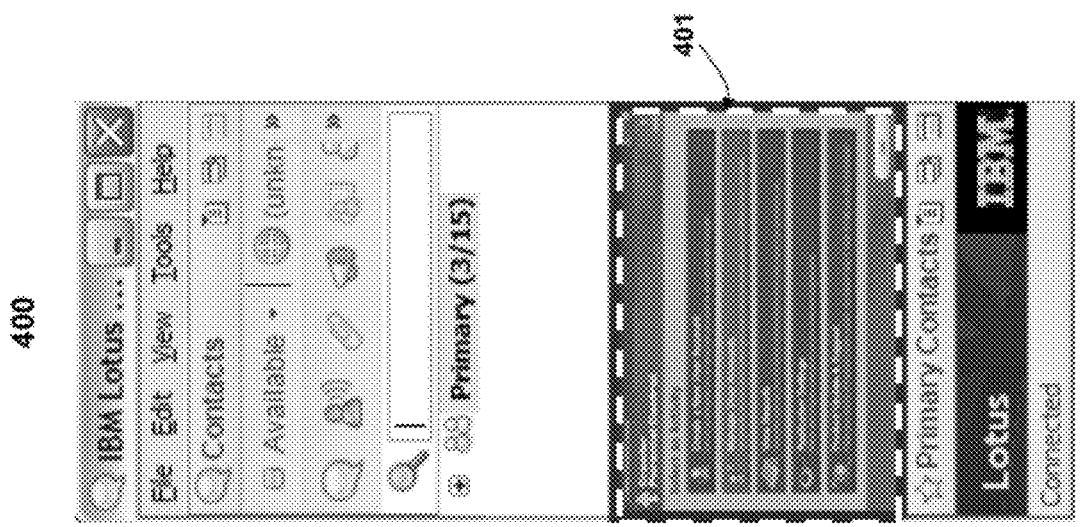
FIG. 4 is visual capture of an Instant Messenger (IM) client window illustrating an information display segment providing status and statistical information to a user, according to one embodiment.

Another example demonstrating the presentation of status or statistical information from the monitored activity is illustrated in FIG. 4. FIG. 4 depicts an Instant Messenger (IM) client window 400 illustrating an information display segment providing status and statistical information to a user, according to one embodiment. IM client window 400 depicts activity selection and stats/info window 401. Similar to the illustration of FIG. 3, status/statistical information 205 providing terms that are set via compromise facility 112 is displayed via activity selection and stats/info window 401 outlined in dashed lines within IM client window 400.

Figure 5:
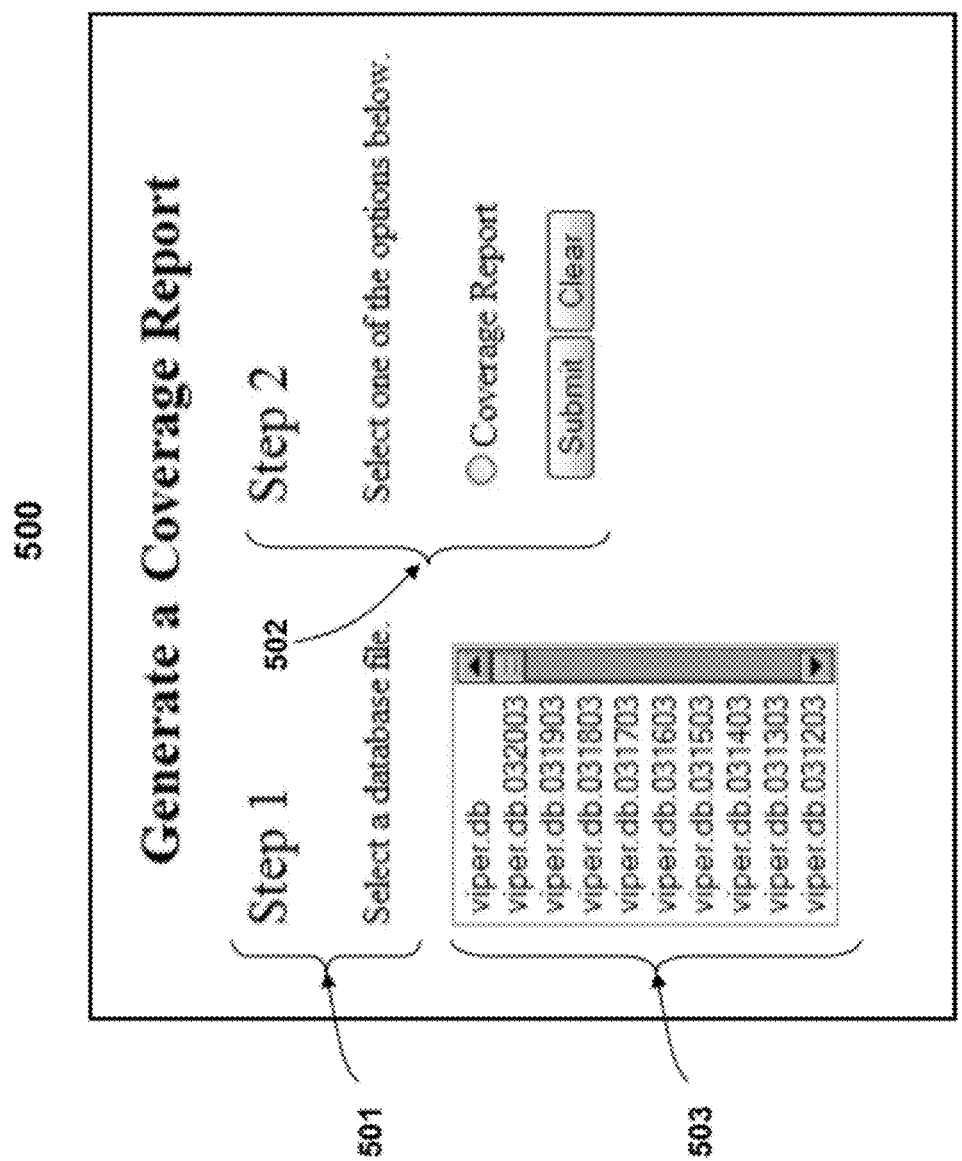
FIG. 5 is a visual capture of the user interface for accessing historical reports of monitored statistics, according to one embodiment.

FIG. 5 illustrates a user interface for accessing historical reports of monitored statistics to generate a coverage report, according to one embodiment. Report presentation 500 depicts selection step-1 501, corresponding scroll list 503, and selection step-2 502 with submit button. In one embodiment, AAC utility 110 (FIG. 1) enables selection of a report(s) 140 (FIG. 1) from scroll list 503 in step-1 501. AAC utility 110 generates the selection report 140, which provides a history of monitored statistics as database files. In one alternate embodiment, instead of obtaining information from generated reports, AAC utility 110 may allow an administrator or user to receive information via blogs, wikis, or other social collaboration method that tracks date, events, and the like with the statistics and information from the compromise facility 112.

In other embodiments, information regarding the compromise or statistics of the monitored application is also kept separate from the application being monitored and/or managed and the information is also made easily accessible. In one implementation, an email summary is utilized to provide information. For example, compromise facility 112 may send an administrator 133 a status email regarding a child/user's activity. A text message summary may also be used to provide information, in an alternate embodiment. Thus, compromise facility 112 may send a parent (administrator 133) a text message with a summary regarding the activity of the parent's child (user 135).

Figure 6:
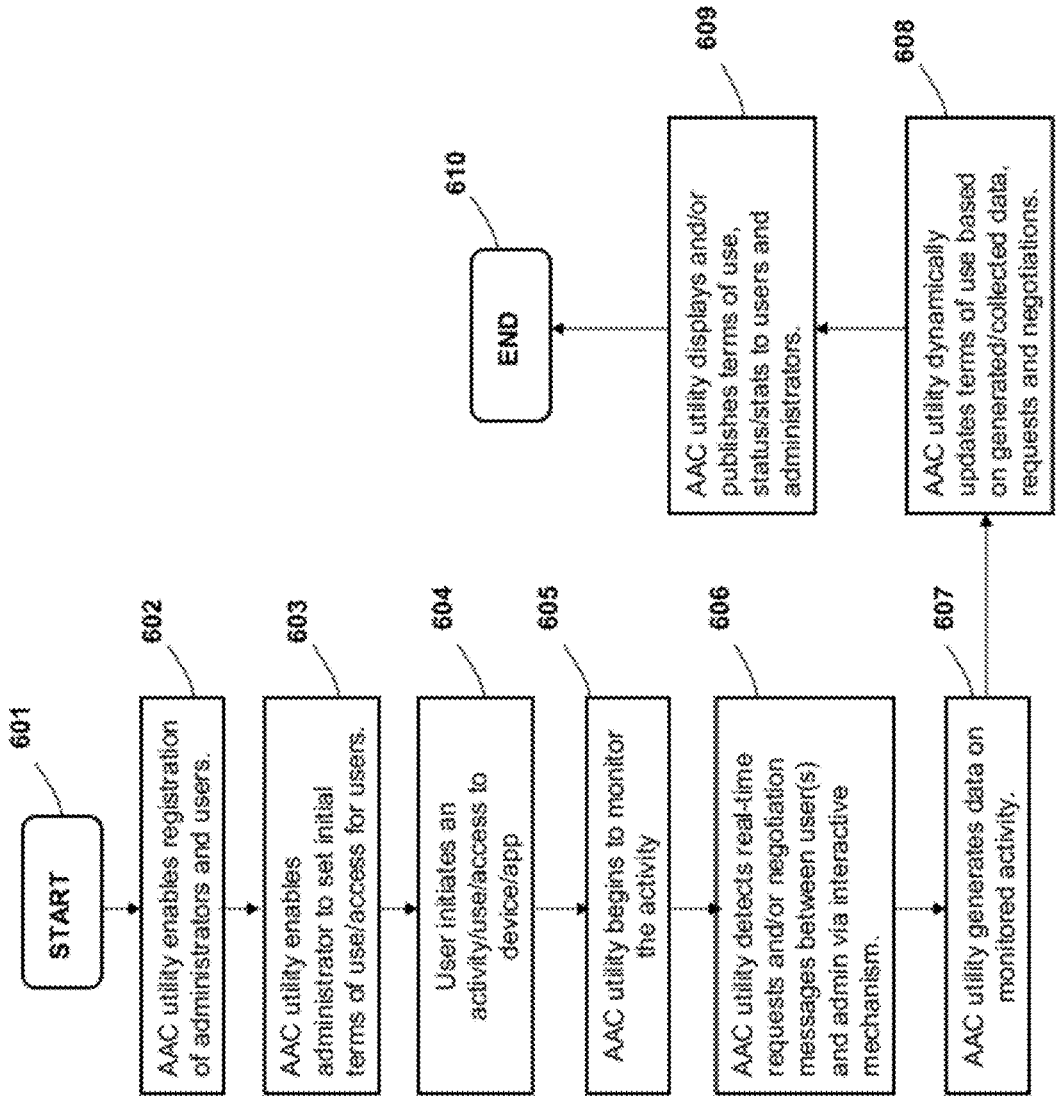
FIG. 6 is a flow chart illustrating the process of configuring a compromise tool and controlling access to activities and devices with the compromise tool, according to one embodiment.

FIG. 6 is a flow chart illustrating the process of configuring a compromise tool and controlling access to activities and devices with the compromise tool based on both administrator and user input and activity, according to one embodiment. Although the methods illustrated in FIG. 6 may be described with reference to components shown in FIGS. 1-5, it should be understood that this is merely for convenience and alternative components and/or configurations thereof can be employed when implementing the various methods. Key portions of the methods may be completed by AAC utility 110 executing within DPS 100 (FIG. 1) and controlling specific operations of/on DPS 100, and the methods are thus described from the perspective of either/both AAC utility 110 and DPS 100.

The process of FIG. 6 begins at initiator block 601 and proceeds to block 602, at which AAC utility 110 receives from an administrator a request to register administrators and users for access and/or usage of a particular service/application/device. At block 603, AAC utility 110 registers the administrators and users and enables the administrator to set initial terms of use/access regarding a set of applications and devices for the group of users. In one embodiment, the terms may include a hierarchy of relative priority of the various administrators and users. The AAC utility enables administrator access to a compromise facility via a centralized access point to establish the terms guiding usage. For example, the terms of use may include the following parameters, without limitation: permissions regarding an activity; amount of access time; and access schedule. At block 604, the AAC utility detects (or receives information) that a user initiates an activity according to the terms of use. At block 605, the AAC utility initiates the monitoring of the activity. The AAC utility 110 detects real-time requests and/or negotiation messages between the user(s) and administrator via an interactive mechanism, as shown at block 606.

Then, as shown at block 607, the AAC utility generates data on monitored user and administrator activity. This data may be stored as historical data for future reference. AAC utility 110 dynamically updates terms of use based on generated/collected data, received requests, and negotiation messages detected during activity monitoring, as shown at block 608. In one embodiment, the AAC utility 110 may perform dynamic updates based on user request(s), occurrence of a special event, and/or completion of other internal or external tasks. At block 609, AAC utility 110 facilitates the display or publishing of terms of use, status information, statistical information (from collected data) to the users and administrators. The process ends at block 610.

In the flow charts above, one or more of the methods are embodied as a computer program product in a computer readable medium or containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

Generally, the above described embodiments provide a computer-implemented method that provides the following features and functionalities, among others. These features and functionalities are presented without limitation and should be given their broadest scope, including any and all equivalents thereto. The method comprises: enabling multiple accesses to a compromise facility, where the compromise facility provides an interactive mechanism for real time negotiation and resolution of one or more terms of usage of/access to at least one of a device or an activity; receiving, by way of an administrator identifier (ID) to the compromise facility (1) a selection of the device or activity, and (2) an identification of one or more user identifiers (IDs) to be provided access to the device or activity; monitoring subsequent access(es) to/usage of the device or activity by the one or more users; dynamically generating and updating one or more of the terms of usage of/access to the device or activity based on one or more parameters, including the monitored access(es) to/usage of the device or activity; and publishing via the interactive mechanism to an interface associated with the device or activity, the one or more terms associated with the access(es) to/usage of the device or activity.

Additionally, in one embodiment the receiving further comprises receiving one or more initial terms for managing the access(es) to usage of the device or activity by the one or more users IDs. The method further comprises: configuring the access(es) to/usage of the device or activity by the one or more users based on the one or more terms received from the administrator ID; receiving, from one or more of the user IDs, a request for negotiation of/modification to one or more of the terms; and when pre-set term modification conditions are enabled and the request falls within a pre-identified trigger condition for enabling the requested modification: dynamically modifying the one or more terms based on the request; and forwarding the modification of the one or more terms to the interface of at least one of the administrator ID and the user ID via the interactive mechanism to update the terms published within the corresponding interface, wherein changes to the terms at the compromise facility are dynamically updated within the interface(s) associated with the device or activity.

When pre-set term modification conditions are not enabled, the method further comprises: forwarding the request to an administrator interface associated with the administrator ID; on receipt of a response to the request from the administrator ID, updating the one or more terms based on the response received from the administrator ID; and forwarding the updates to the one or more terms to the interface(s) of at least one of the administrator ID and the user ID via the interactive mechanism to update the terms published within the interface(s), wherein changes to the terms at the compromise facility are dynamically updated within the interface(s) associated with the device or activity.

In one embodiment, the receiving process comprises receiving the request via the interface associated with the device or activity, which interface is displayed in association with the device or activity on a local device utilized to access the compromise facility by at least one of the administrator ID or the user ID; and the publishing comprises publishing the one or more term within the interface corresponding to each of the administrator ID and the user ID.

Further, in yet another embodiment, the method comprises: downloading a terms/usage plug-in to one or more devices utilized to access the compromise facility via one of the administrator ID or the user ID; forwarding updates, requests, and statistical information to the interface for display therein; and enabling interactive access to the compromise facility via an interface generated by the plug-in, wherein the interactive access includes receipt of input from the interface and publication of terms and updates to the interface.

The method further comprises: receiving a request for negotiation of at least one term related to usage of/access to the device or activity, where the request is received from at least one party identified from among the administrator ID and the one or more user IDs; determining a relative priority assigned to the ID of each party to the negotiation; facilitating a negotiation outcome based on one or more of: (a) the relative priority of one or more IDs involved in the negotiation; (b) historical data associated with the usage of/access to the device or activity; and (c) pre-configured limitations and thresholds established for the usage of/access to the device or activity; and enabling dynamic updates to information regarding one or more of: base guidelines for an activity; and terms of usage of a device, based on the negotiated outcome.

Other embodiments, encompassing other functional steps are also provided herein.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture (or computer program product) in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a computer program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a data processing system, a method comprising:
receiving an administrator identifier (ID) associated with an administrator of a compromise facility who provides a selection of one of a device and an activity and an identification of one or more user identifiers (IDs) to be provided usage and access to the selected one of the device and the activity, wherein the compromise facility provides an interactive mechanism for real time negotiation and resolution of one or more terms of usage and one or more terms of access to at least one of the device and the activity;
configuring access to and usage of the selected one of the device and the activity by the one or more user IDs based on one or more initial terms of usage and one or more initial terms of access received from the administrator ID;
monitoring one or more subsequent accesses to and subsequent usage of the selected one of the device and the activity by the one or more users IDs;
dynamically updating, for the selected one of the device and the activity, at least one of the one or more initial terms of usage and the one or more initial terms of access based on one or more parameters to create one or more terms of access and one or more terms of usage for the selected one of the device and the activity, the one or more parameters including the monitored one or more subsequent accesses to and usage of the selected one of the device and the activity; and
publishing, via the interactive mechanism, to an interface associated with the selected one of the device and the activity the one or more terms of access, and the one or more terms of usage for the selected one of the device and the activity; and
in response to an amount of time granted to use the selected one of the device and the activity being based on a number of points credited to each of the one or more user IDs:
establishing a point allocation mechanism for allocating points to the one or more user IDs;
determining a time scale factor associated with the selected one of the device and the activity to which the points are applied; and
indicating within the interface a remaining number of points accrued by at least one of the one or more user IDs, wherein points accrued by a first user ID are independent of points accrued by a second user ID.

2. The method of claim 1, wherein:
said receiving further comprises receiving the one or more initial terms of access, wherein the one or more initial terms of access manage the access(es) to the selected one of the device and the activity by the one or more users IDs; and said method further comprises:
  receiving, from the one or more user IDs, a request for at least one of negotiation of and modification to at least one of the one or more of the initial terms of access and the one or more initial terms of usage; and
  in response to the request falling within a pre-identified trigger condition for enabling the requested modification:
    dynamically modifying the at least one of the one or more initial terms of access and the one or more initial terms of usage based on the request to generate at least one of the one or more modified terms of access and one or more modified terms of usage; and
    forwarding the at least one of the one or more modified terms of access and the one or more modified terms of usage, via the interactive mechanism, to the interface of at least one of the administrator ID and the one or more user IDs to update one or more published terms within the interface of at least one of the administrator ID and the one or more user IDs, wherein changes to the at least one of the one or more initial terms of access and the one or more initial terms of usage at the compromise facility are dynamically updated within one or more interface(s) associated with the selected one of the device and the activity.

3. The method of claim 1, further comprising:
receiving, from the one or more user IDs, a request for at least one of negotiation of and modification to at least one of the one or more initial terms of access and the one or more of the initial terms of usage;
determining whether a pre-set term modification condition is enabled during which a request to modify the at least one of the one or more initial terms of access and the one or more initial terms of usage can trigger a modification; and
in response to the pre-set term modification condition not being enabled:
  forwarding the request to an administrator interface associated with the administrator ID;
  receiving a response from the administrator ID;
  in response to the received response being a positive response allowing for the requested, modifying the at least one of the one or more initial terms of access and the one or more initial terms of usage based on the response received from the administrator ID to generate at least one of the one or more updated terms of access and one or more updated terms of usage; and
  forwarding the at least one of the one or more updated terms of access and one or more one or more updated terms of usage, via the interactive mechanism, to the interface of at least one of the administrator ID and the one or more user IDs to update one or more published terms within the interface of at least one of the administrator ID and the one or more user IDs, wherein changes to the at least one of the one or more initial terms of access and the one or more initial terms of usage at the compromise facility are dynamically updated within one or more interface(s) associated with selected one of the device and the activity.

4. The method of claim 1, further comprising:
displaying the interface associated with the selected one of the device and the activity on a local device utilized to access the compromise facility by at least one of the administrator ID or the one or more user IDs, wherein requests for updating the one or more terms of usage and the one or more terms of access are received via the interface associated with the selected one of the device and the activity; and wherein said publishing further comprises:
  publishing the one or more terms of access and the one or more terms of usage within an interface corresponding to each of the administrator ID and the one or more user IDs; and
  publishing within the interface corresponding to each of the administrator ID and the one or more user IDs status and statistical information about current usage and current access.

5. The method of claim 1, further comprising:
downloading a plug-in to one or more devices utilized to access the compromise facility via one of the administrator ID or the one or more user ID, wherein the plug-in is one of a terms plug-in and a usage plug-in;
forwarding one or more of updates, requests, and statistical information to the interface for display therein; and
enabling interactive access to the compromise facility via an interface generated by the plug-in, wherein the interactive access includes receipt of input from the interface and publication of one or more terms and updates to the interface.

6. The method of claim 1, further comprising:
receiving a request for negotiation of the at least one of the one or more terms of usage and the one or more terms of access for the selected one of the device and the activity, wherein the request is received from at least one party from among the administrator ID and the one or more user IDs;
determining a relative priority assigned to one or more IDs of each for the at least one party to the requested negotiation;
facilitating a negotiation outcome based on one or more of: the relative priority of the one or more IDs involved in the negotiation; historical data associated with at least one of the one or more terms of access and one or more terms of usage for the selected one of the device and the activity; and one or more pre-configured limitations and thresholds established for the usage of and access to the selected one of the device and the activity; and
in response to facilitating the negotiated outcome, enabling dynamic updates to information regarding one or more of base guidelines for an activity and terms of usage of a device.

7. The method of claim 1, further comprising:
registering, within the compromise facility, the administrator ID and the one or more user IDs in association with the selected one of the device and the activity;
enabling the administrator ID to set one or more initial terms as base terms for the selected one of the device and the activity, the base terms including one or more of: permission to use a device; permission to access an activity; an amount of time granted to use of the device; an amount of time granted to access the activity; a schedule to use the device; and a schedule to access the activity;
during access to the compromise facility, publishing the base terms to the interfaces provided to the one or more user IDs and administrator ID.

8. The method of claim 1, further comprising:
monitoring one or more of an initial activity and an initial device usage by at least one of the one or more user IDs;

collecting information related to the one or more of the initial activity and the device usage;

providing an interactive interface within which is displayed at least one of the one or more initial terms of usage and the one or more initial terms of access;

enabling real-time receipt of requests from the one or more user IDs via the interface;

dynamically re-evaluating the one or more terms of usage and the one or more terms of access based on one or more of: the collected information; a user request; one or more negotiation messages; an occurrence of a particular event; and completion of at least one of an internal task and an external task;

providing real-time status and statistical information from a monitored activity to at least one of the administrator ID and the one or more user IDs via the interactive interface;

incorporating status and statistical information of the monitored activity into one or more of an application being monitored and a separate application, wherein the status and statistical information is incorporated into and transmitted via the interactive interface within one or more applications via one or more communication mechanisms including: an IM client; an email; a text message; one or more generated reports; and a website.

9. A data processing system comprising:
a processor;
a mechanism that connects the data processing system to a network having one or more communication devices;
a utility which executes on the processor to cause the data processing system to:
  receive an administrator identifier (ID) associated with an administrator of a compromise facility who provides a selection of one of a device and an activity and an identification of one or more user identifiers (IDs) to be provided usage and access to the selected one of the device and the activity, wherein the compromise facility provides an interactive mechanism for real time negotiation and resolution of one or more terms of usage and one or more terms of access to at least one of the device and the activity;
  configure access to and usage of the selected one of the device and the activity by the one or more user IDs based on one or more initial terms of usage and one or more initial terms of access received from the administrator ID;
  monitor one or more subsequent accesses to and subsequent usage of the selected one of the device and the activity by the one or more users IDs;
  dynamically update, for the selected one of the device and the activity, at least one of the one or more initial terms of usage and the one or more initial terms of access based on one or more parameters to create one or more terms of access and one or more terms of usage for the selected one of the device and the activity, the one or more parameters including the monitored one or more subsequent accesses to and usage of the selected one of the device and the activity;
  publish, via the interactive mechanism, to an interface associated with the selected one of the device and the activity the one or more terms of access, and the one or more terms of usage for the selected one of the device and the activity; and
  in response to an amount of time granted to use the selected one of the device and the activity being based on a number of points credited to each of the one or more user IDs:
    establish a point allocation mechanism for allocating points to the one or more user IDs;
    determine a time scale factor associated with the selected one of the device and the activity to which the points are applied; and
    indicate within the interface a remaining number of points accrued by at least one of the one or more user IDs, wherein points accrued by a first user ID are independent of points accrued by a second user ID.

10. The data processing system of claim 9, wherein said utility further causes the data processing system to:
  receive, from the one or more user IDs, a request for at least one of negotiation of and modification to at least one of the one or more of the initial terms of access and the one or more initial terms of usage;
  determine whether a pre-set term modification condition is enabled during which a request to modify at least one of the one or more initial terms of access and the one or more initial terms of usage can trigger a modification; and
  in response to the pre-set term modification condition not being enabled:
    forward the request to an administrator interface associated with the administrator ID;
    receive a response from the administrator ID;
    in response to the received response being a positive response allowing for the requested modifying the at least one of the one or more initial terms of access and the one or more initial terms of usage based on the response received from the administrator ID to generate at least one of the one or more updated terms of access and one or more updated terms of usage; and
    forward the at least one of the one or more updated terms of access and one or more one or more updated terms of usage, via the interactive mechanism, to the interface of at least one of the administrator ID and the one or more user IDs to update one or more published terms within the interface of at least one of the administrator ID and the one or more user IDs, wherein changes to the at least one of the one or more initial terms of access and the one or more initial terms of usage at the compromise facility are dynamically updated within one or more interface(s) associated with selected one of the device and the activity.

11. The data processing system of claim 9, wherein said utility further causes the data processing system to:
  download a plug-in to one or more devices utilized to access the compromise facility via one of the administrator ID or the one or more user ID, wherein the plug-in is one of a terms plug-in and a usage plug-in;
  register, within the compromise facility, the administrator ID and the one or more user IDs in association with the selected one of the device and the activity;
  enable the administrator ID to set one or more initial terms as base terms for the selected one of the device and the activity, the base terms including one or more of: permission to use a device; permission to access an activity; an amount of time granted to use of the device; an amount of time granted to access the activity; a schedule to use the device; and a schedule to access the activity;
  during access to the compromise facility, publish the base terms to the interfaces provided to the one or more user IDs and administrator ID;
  forward one or more of updates, requests, and statistical information to the interface for display therein;

enable interactive access to the compromise facility via an interface generated by the plug-in, wherein the interactive access includes receipt of input from the interface and publication of one or more terms and updates to the interface;

display the interface associated with the selected one of the device and the activity on a local device utilized to access the compromise facility by at least one of the administrator ID or the one or more user IDs, wherein requests for updating the one or more terms of usage and the one or more terms of access are received via the interface associated with the selected one of the device and the activity; and said utility causes the data processing system to publish by:
publishing the one or more terms of access and the one or more terms of usage within an interface corresponding to each of the administrator ID and the one or more user IDs; and publishing within the interface corresponding to each of the administrator ID and the one or more user IDs status and statistical information about current usage and current access within the interface.

12. The data processing system of claim 9, said utility further causes the data processing system to:
receive a request for negotiation of the at least one of the one or more terms of usage and the one or more terms of access for the selected one of the device and the activity, wherein the request is received from at least one party from among the administrator ID and the one or more user IDs;

determine a relative priority assigned to one or more IDs of each for the at least one party to the requested negotiation;

facilitate a negotiation outcome based on one or more of: the relative priority of the one or more IDs involved in the negotiation; historical data associated with at least one of the one or more terms of access and one or more terms of usage for the selected one of the device and the activity; and one or more pre-configured limitations and thresholds established for the usage of and access to the selected one of the device and the activity; and in response to facilitating the negotiated outcome, enable dynamic updates to information regarding one or more of base guidelines for an activity and terms of usage of a device.

13. The data processing system of claim 9, said utility further causes the data processing system to:
monitor one or more of an initial activity and an initial device usage by at least one of the one or more user IDs;
collect information related to the one or more of the initial activity and the device usage;
provide an interactive interface within which is displayed at least one of the one or more initial terms of usage and the one or more initial terms of access;
enable real-time receipt of requests from the one or more user IDs via the interface;
dynamically re-evaluate the one or more terms of usage and the one or more terms of access based on one or more of: the collected information; a user request; one or more negotiation messages; an occurrence of a particular event; and completion of at least one of an internal task and an external task;
provide real-time status and statistical information from a monitored activity to at least one of the administrator ID and the one or more user IDs via the interactive interface;
incorporate status and statistical information of the monitored activity into one or more of an application being monitored and a separate application, wherein the status and statistical information is incorporated into and transmitted via the interactive interface within one or more applications via one or more communication mechanisms including: an IM client; an email; a text message; one or more generated reports; and a website.

14. A computer program product comprising:
a computer readable storage device; and
program code on said computer readable storage device that when executed within a data communication device, said program code enables the data communication device to provide the functionality of:
receiving an administrator identifier (ID) associated with an administrator of a compromise facility who provides a selection of one of a device and an activity and an identification of one or more user identifiers (IDs) to be provided usage and access to the selected one of the device and the activity, wherein the compromise facility provides an interactive mechanism for real time negotiation and resolution of one or more terms of usage and one or more terms of access to at least one of the device and the activity;

configuring access to and usage of the selected one of the device and the activity by the one or more user IDs based on one or more initial terms of usage and one or more initial terms of access received from the administrator ID;

monitoring one or more subsequent accesses to and subsequent usage of the selected one of the device and the activity by the one or more users IDs;

dynamically updating, for the selected one of the device and the activity, at least one of the one or more initial terms of usage and the one or more initial terms of access based on one or more parameters to create one or more terms of access and one or more terms of usage for the selected one of the device and the activity, the one or more parameters including the monitored one or more subsequent accesses to and usage of the selected one of the device and the activity;

publishing, via the interactive mechanism, to an interface associated with the selected one of the device and the activity the one or more terms of access, and the one or more terms of usage for the selected one of the device and the activity; and in response to an amount of time granted to use the selected one of the device and the activity being based on a number of points credited to each of the one or more user IDs:
establishing a point allocation mechanism for allocating points to the one or more user IDs;
determining a time scale factor associated with the selected one of the device and the activity to which the points are applied; and
indicating within the interface a remaining number of points accrued by at least one of the one or more user IDs, wherein points accrued by a first user ID are independent of points accrued by a second user ID.

15. The computer program product of claim 14, wherein said program code further comprising code for:
receiving, from the one or more user IDs, a request for at least one of negotiation of and modification to at least one of the one or more of the initial terms of access and the one or more initial terms of usage;
determining whether a pre-set term modification condition is enabled during which a request to modify the at least one of the one or more initial terms of access and the one or more initial terms of usage can trigger a modification; and in response to the pre-set term modification condition not being enabled:
  forwarding the request to an administrator interface associated with the administrator ID;
  receiving a response from the administrator ID;
  in response to the received response being a positive response allowing for the requested, modifying the at least one of the one or more initial terms of access and the one or more initial terms of usage based on the response received from the administrator ID to generate at least one of the one or more updated terms of access and one or more updated terms of usage; and
  forwarding the at least one of the one or more updated terms of access and one or more one or more updated terms of usage, via the interactive mechanism, to the interface of at least one of the administrator ID and the one or more user IDs to update one or more published terms within the interface of at least one of the administrator ID and the one or more user IDs, wherein changes to the at least one of the one or more initial terms of access and the one or more initial terms of usage at the compromise facility are dynamically updated within one or more interface(s) associated with selected one of the device and the activity.

16. The computer program product of claim 14, wherein said program code further comprising code for:
  downloading a plug-in to one or more devices utilized to access the compromise facility via one of the administrator ID or the one or more user ID, wherein the plug-in is one of a terms plug-in and a usage plug-in;
  registering, within the compromise facility, the administrator ID and the one or more user IDs in association with the selected one of the device and the activity;
  enabling the administrator ID to set one or more initial terms as base terms for the selected one of the device and the activity, the base terms including one or more of: permission to use a device; permission to access an activity; an amount of time granted to use of the device; an amount of time granted to access the activity; a schedule to use the device; and a schedule to access the activity;
  during access to the compromise facility, publishing the base terms to the interfaces provided to the one or more user IDs and administrator ID;
  forwarding one or more of updates, requests, and statistical information to the interface for display therein; and
  enabling interactive access to the compromise facility via an interface generated by the plug-in, wherein the interactive access includes receipt of input from the interface and publication of one or more terms and updates to the interface; and
  displaying the interface associated with the selected one of the device and the activity on a local device utilized to access the compromise facility by at least one of the administrator ID or the one or more user IDs, wherein requests for updating the one or more terms of usage and the one or more terms of access are received via the interface associated with the selected one of the device and the activity;
  wherein said publishing further comprises: publishing the one or more terms of access and the one or more terms of usage within an interface corresponding to each of the administrator ID and the one or more user IDs; and publishing within the interface corresponding to each of the administrator ID and the one or more user IDs status and statistical information about current usage and current access.

17. The computer program product of claim 14, wherein said program code for enabling further comprises code for:
  monitoring one or more of an initial activity and an initial device usage by at least one of the one or more user IDs;
  collecting information related to the one or more of the initial activity and the device usage;
  providing an interactive interface within which is displayed at least one of the one or more initial terms of usage and the one or more initial terms of access;
  enabling real-time receipt of requests from the one or more user IDs via the interface;
  dynamically re-evaluating the one or more terms of usage and the one or more terms of access based on one or more of: the collected information; a user request; one or more negotiation messages; an occurrence of a particular event; and completion of at least one of an internal task and an external task;
  providing real-time status and statistical information from a monitored activity to at least one of the administrator ID and the one or more user IDs via the interactive interface;
  incorporating status and statistical information of the monitored activity into one or more of an application being monitored and a separate application, wherein the status and statistical information is incorporated into and transmitted via the interactive interface within one or more applications via one or more communication mechanisms including: an IM client; an email; a text message; one or more generated reports; and a website.

* * * * *